July 13, 1965 P. W. TISHER ET AL 3,195,145
SPECTACLE LENS SYSTEM HAVING PROTECTIVE MAJOR LENS
AND DETACHABLE POSTERIOR CORRECTIVE LENS
Filed June 10, 1964 2 Sheets-Sheet 1

*INVENTOR.*
PAUL W. TISHER
HARRY KRAMER
BY
ATTORNEY

July 13, 1965 P. W. TISHER ET AL 3,195,145
SPECTACLE LENS SYSTEM HAVING PROTECTIVE MAJOR LENS
AND DETACHABLE POSTERIOR CORRECTIVE LENS
Filed June 10, 1964 2 Sheets-Sheet 2

INVENTOR.
PAUL W. TISHER
HARRY KRAMER
BY
Peter L. Costas
ATTORNEY

3,195,145
SPECTACLE LENS SYSTEM HAVING PROTECTIVE MAJOR LENS AND DETACHABLE POSTERIOR CORRECTIVE LENS

Paul W. Tisher and Harry Kramer, New Britain, Conn., assignors, by mesne assignments, to Dr. William Smith, Los Angeles, Calif., and Younger Manufacturing Co., Los Angeles, Calif., a corporation of California
Filed June 10, 1964, Ser. No. 375,972
10 Claims. (Cl. 351—159)

The present invention generally relates to corrective lenses and, more specifically, to a composite lens system having variable corrective factors and to spectacles made therefrom.

This application is a continuation-in-part of my co-pending application Serial Number 197,376 filed May 24, 1962, now abandoned.

Following surgery for various eye disorders such as removal of cataracts and correction of detached retinas, it is generally essential to protect the retina and ciliary bodies from the traumatic effects of light stimuli and to protect the retina and adnexa from any physical trauma such as might be caused by inadvertent or unconscious contact with the fingers, bed clothes, or other foreign objects. Ultraviolet rays are considered particularly harmful to the post-operative eye due to the light trauma which may be induced thereby. Accordingly, it has been the general practice to completely cover the post-operative eye and adnexa with surgical dressings during at least the initial portion of the post-operative period.

Where both eyes are affected by the surgery or the vision of the unoperated eye is impaired, this has resulted in incapacitation of the patient since he is unable to see and perform even routine acts of personal care or to be self-ambulatory. It has previously been proposed to provide gauze dressings which would protect the eye and adnexa from physical trauma and which would contain as an insert a small corrective lens to enable the patient to see through the dressing. This practice has not been widely utilized due to various problems inherent therein such as protecting the retina and ciliary bodies from light trauma, locating the lens within the dressing relative to the patient's retina, and the necessity for compensating the variation in the optic axis during recovery from certain operative procedures such as cataract removal.

It is an object of the present invention to provide a corrective lens system including a protective lens of major dimension adapted to reduce substantially the likelihood of physical and light trauma to the eye and a corrective lens of lesser dimension affixed thereto which will permit facile variation of the degree and nature of correction.

It is a specific object to provide such a corrective lens system adapted to provide protection to the orbital region and facile, variable correction to the eye following surgical procedures thereon despite the incorporation of lenses of high corrective factors.

Another object is to provide a corrective lens system in which the corrective lens may be quickly and easily replaced or varied about the optic axis by the attending surgeon or optician during post-operative care and which can be used thereafter for normal corrective purposes.

Still another object is to provide a relatively inexpensive corective lens system permitting facile variation of the correction provided thereby which is relatively simple and rugged in construction and which provides a pleasing appearance similar to that of normal sunglasses to the viewers.

A further object is to provide spectacles incorporating a corrective lens system having a protective lens of major dimension adapted to reduce substantially the liklihood of physical and light trauma to the eye and a corrective lens of lesser dimension affixed thereto which enables facile variation of the degree and nature of correction and wide versatility of application.

Other objects and advantages will be readily apparent from the following detailed specification and claims and the attached drawing wherein:

It has now been found that the foregoing and related objects can be attained by use of lens system having a synthetic plastic protective lens of major dimension adapted to overlie and protect the orbital region, a corrective lens of lesser dimension and means releasably mounting the corrective lens upon the posterior surface of the protective lens and providing a peripheral seal therebetween to prevent contamination and soiling of the opposed surfaces. Although various colorless synthetic plastics which exhibit a very high degree of ultraviolet absorption may be employed for the protective lens, it is preferable to fabricate the protective lens from a colored but optically transparent plastic so as to obtain optimum absorption of infrared and ultraviolet rays and to obtain optimum cosmetic properties by effectively concealing the corrective lens and its mounting from view while also concealing the optical effect of the corrective lens upon the size of the pupil.

Figure 1:
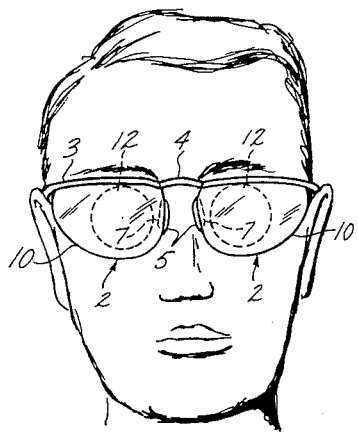
FIGURE 1 is a front elevational view of spectacles embodying the present invention as worn by a user.
Figure 2:
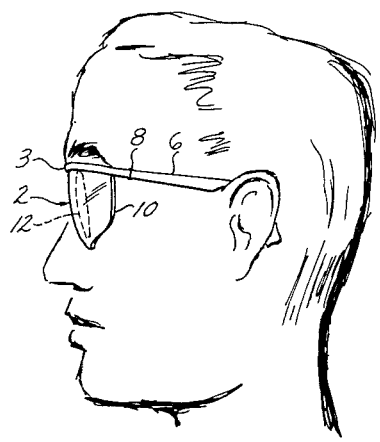
FIGURE 2 is a side elevational view of the spectacles of FIGURE 1 as worn by a user.

Referring in detail to the attached drawings, FIGURES 1 and 2 illustrate spectacles embodying the present invention as worn by a user. Generally, the spectacles include a pair of corrective lens systems generally designated by the numerals 2, 2 which are mounted upon the support elements 3, 3 connected by the bridge 4, and temples 6, 6 which are connected to the outer edges of the support elements 3, 3 by hinges 8, 8 and extend rearwardly of the user's head to seat behind the ears. Nose pads 5, 5 are carried by nose pad support assemblies 7, 7 depending from the bridge 4.

Figure 3:
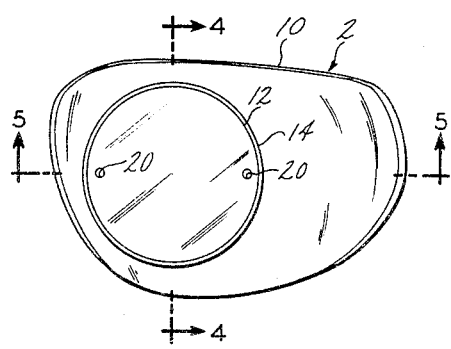
FIGURE 3 is a rear elevational view of a lens system embodying the present invention.
Figures 4, 6:
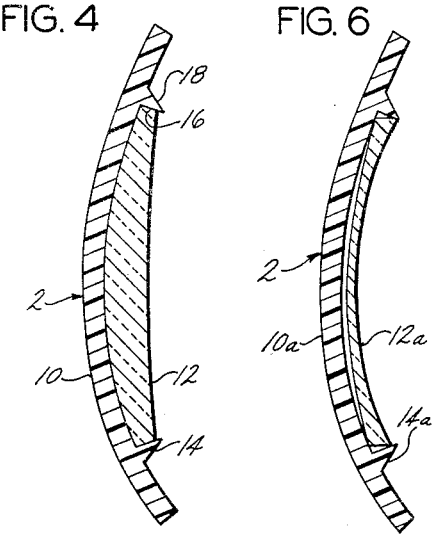
FIGURE 4 is a vertical sectional view to an enlarged scale along the line 4—4 of FIGURE 3.
FIGURE 6 is a vertical sectional view of a lens system similar to FIGURE 4 and incorporating a corrective lens of negative power.
Figure 5:
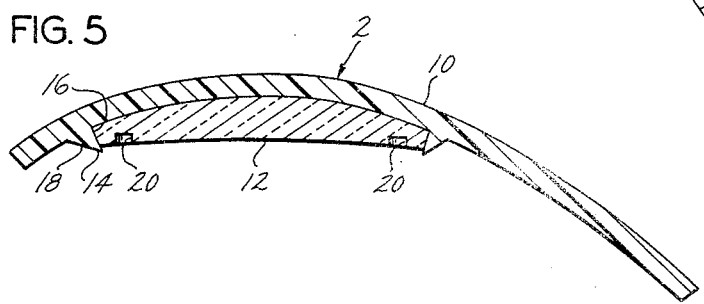
FIGURE 5 is a horizontal sectional view to an enlarged scale along the line 5—5 of FIGURE 3.

As best seen in FIGURES 3–5, each of the lens systems 2,2 consists of a protective lens 10 of major dimension and a corrective lens 12 of lesser dimension which is mounted upon the posterior surface of the protective lens 10 by an annular lip or ring 14 which preferably is integrally formed upon the posterior surface of the protective lens and which extends about the periphery of the corrective lens 12.

As best seen in FIGURES 4 and 5, the lip 14 decreases in cross section to its free end to provide a generally triangular cross section defined by a pair of walls 16, 18 which converge and are of greater axial height than the axial thickness of the corrective lens 12. The inside wall 16 of the lip 14 also is inclined inwardly towards the free end or apex of the lip 14 so that the aperture defined by its apex or free end is slightly smaller than the peripheral dimension of the corrective lens 12 and the outer or free end portion of the lip overlaps the posterior surface of the corrective lens in addition to frictionally engaging the side edge thereof. In this manner, a dirt and fluid-tight seal is provided for the opposed surfaces of the lenses 10, 12 to ensure optimum optical properties of the lens system.

To facilitate rotation of the corrective lens 12 within the lip 14, a pair of diametrically spaced recesses 20 are provided in the posterior face of the corrective lens 12 adjacent its periphery for receiving a suitable tool such as a spanning wrench to exert a torque upon the lens 12 and thereby rotate it about its optic axis relative to the protective lens 10.

Although some resiliency may be provided in the lip 14 by certain synthetic plastic formulations and proper dimensioning and configuration so as to enable snap-fitting of the corrective lens 12 therein at ambient temperatures, the preferred plastics are sufficiently rigid so as to limit such snap-fitting and the lip 14 preferably retains the corrective lens 12 in position with substantial rigidity to prevent inadvertent movement. Accordingly, the corrective lens 12 may be easily inserted into or extracted from the ring 14 by heating the protective lens 10 sufficiently to expand the synthetic plastic and thereby the ring 14, an amount of about 0.002 to 0.006 inch being generally sufficient to move the free end of the lip 14 outwardly relative to the periphery of the corrective lens 12 to enable removal thereof. Although the coefficient of expansion of the corrective lens 12 may be the same as that of the protective lens 10 when the same or similar plastic material is employed therefor, the heat is applied to the anterior surface of the protective lens 10 and the heat transmission therebetween is sufficiently inefficient to ensure a thermal gradient, particularly since some air spacing along the major portion of their opposed surfaces will normally exist in the assembly. In this manner, the corrective lens 12 may be securely retained within the lip 14 but many be readily removed upon heating of the protective lens, conveniently by a sand bath or heated air.

Since the lip 14 firmly engages the cooperatively inclined side edge of the corrective lens 12 and extends about the entire periphery thereof, an excellent seal is provided about the periphery of the corrective lens 12 and, therefore, of the opposed surfaces of the lenses 10, 12 to prevent entry of fluids, dusts or other foreign materials therebetween which would contaminate or soil the opposed surfaces. Thus, the lens system may be kept clean and optically clear despite the air spacing that will generally exist between the opposed surfaces of the lenses.

Since it is quite difficult to ensure total contact across the entire opposed surfaces of the lenses in commercial practice, the lenses preferably are configured to provide minor air spacing between their opposed surfaces by proper selection of the radii defining the curves. In this manner, the undesirable occurrency of Newton rings due to imperfect surface contact can be avoided.

In this connection, it will be noted a corrective lens 12 of high positive correction has been shown in FIGURES 3–5 as having a convex anterior face which conforms to the curve of the posterior face of the curvilinear protective lens 10. In FIGURE 6, a corrective lens 12a of high negative correction is illustrated resulting in a substantial air spacing between the opposed anterior face of the corrective lens 12a and posterior surface of the curvilinear protective lens 10a. In this embodiment the side edge of the corrective lens 12a is parallel to the axis of the lens system and the lip 14a firmly engages the posterior side edge of the corrective lens to provide a tight seal thereabout, the area of which may be increased by providing a cooperating bevel about the edge. Alternatively, the side edge of the corrective lens 12 may be tapered so that its anterior edge will engage the base portion of the lip 14, but this is somewhat less desirable in that dirt and liquid may accumulate in the spacing between the lip and remaining portion of the side edge of the protective lens.

Referring more in detail to the protective lenses 10 and 10a of FIGURES 1–6, the front and rear surfaces thereof are cooperatively curved so as to provide a lens component which has substantially no optical power. The preferred lens systems of the present invention employ protective lenses of convex curvilinear cross section which are substantially a segment of a sphere. By use of such curvilinear cross section, the protective lens 10 can conform more closely to the shape of the head and thereby closely overlie the margins of the orbital region to provide optimum protection from physical and light trauma. It will readily be apparent that use of the spherical segment configuration enables optimum optical resolution.

As best seen in FIGURES 1 and 2, the top edge portion of the protective lens 10 in the illustrated embodiment is substantially linear and the bottom edge portion and outer side edge portion are smoothly curvilinear and drawn by a large radius to conform closely to the corresponding periphery of the eye socket in the head. The inner side edge portion is also curvilinear but drawn by a considerably smaller radius so as to fit closely along the side of the nose and blend smoothly into the bottom and top edge portions. In order to fully overlie the periphery of the eye socket in the head and conform closely thereto for comfort and optimum protection, the protective lens is of greater dimension horizontally than vertically.

Figure 7:
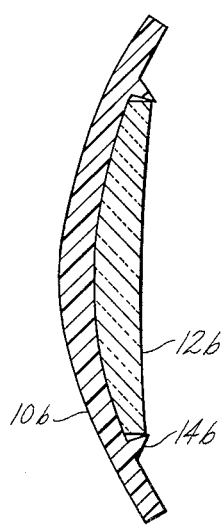
FIGURE 7 is a vertical sectional view of an alternate embodiment of lens system.
Figure 8:
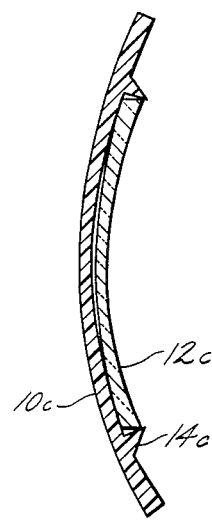
FIGURE 8 is a similar view of another embodiment of lens system.

Referring now to the embodiments of FIGURES 7 and 8, the protective lenses 10b and 10c respectively have been molded with corrective power in the portion overlying the corrective lenses 12b and 12c so as to provide a composite correction in cooperation therewith. Thus, the relative curvature of the two surfaces of the protective lens 10b provides a positive correction cooperating with that of the corrective lens 12b and the relative curvature of the two surfaces of the protective lens 10c provides a negative correction cooperating with that of the corrective lens 12c. In this manner, a composite correction can be obtained with greater optical clarity and resolution which may be advantageous when high negative or positive corrections are desired.

Figure 9:
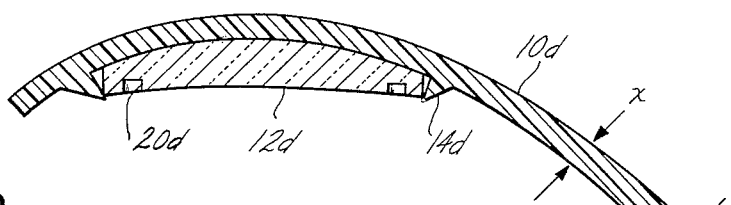
FIGURE 9 is a horizontal sectional view of still another embodiment of lens system.
Figure 10:
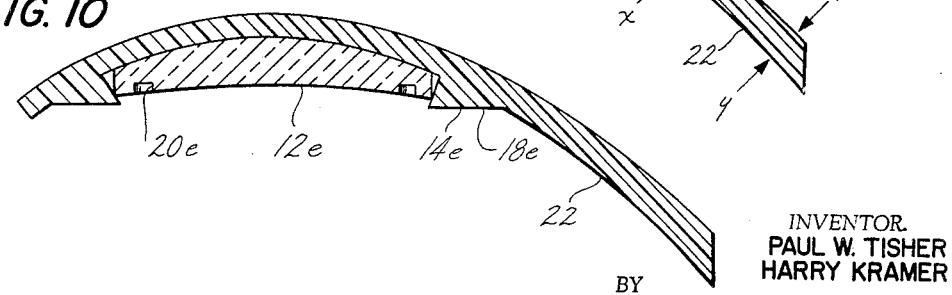
FIGURE 10 is a similar view employing an alternative cross-sectional configuration for the annular lip portion.

Referring now to FIGURES 9 and 10, the protective lenses 10d and 10e therein have center portions overlying the corrective lenses 12d and 12e which are essentially without corrective power but the surfaces of the horizontally extending wrap-around portion 22 diverge to provide a negative correction as indicated by the greater thickness at $y$—$y$ than at $x$—$x$ in FIGURE 9. This negative correction in this wrap-around portion 22 creates a prismatic effect which is believed to produce a prismatic effect bending the light toward the eye and thereby to create ease of peripheral vision for the patient in some instances. Such a correction in the protective lens is particularly desirable for patients requiring a negative correction.

In FIGURE 10, the lip 14e is of reinforced cross-section by having its outer peripheral surface or side 18e lying in a plane rather than diverging as in lip 14 of the embodiments of FIGURES 4–9. Although the cross-section of the lip 14e is still generally triangular, the greater included angle between the sides thereof results in greater thickness, greater rigidity and greater strength to withstand abuse. Nevertheless, this reinforced triangular lip 14 appears substantially invisible to a viewer as does the thinner triangular cross-section of the lip 14 in the other embodiments.

The protective lens of the present invention is fabricated from a synthetic plastic material of excellent optical clarity and having an index of refraction approximating that of optical glass. It should be of sufficient resiliency to retain its initial configuration under the stresses applied thereto during normal usage and have high impact strength and surface hardness to resist marring. The plastic should also have relatively low shrinkage characteristics during heat fabrication for precison molding or casting. It should have form stability to temperatures of about 150 degrees Fahrenheit to prevent distortion during normal usage and preferably a good plastic memory to return to the fabricated configuration in the event of heating to the point of distortion, which factor is largely dependent upon the temperature of fabrication, as is well understood in the art.

Because of optimum properties of clarity, refraction, form stability, impact strength and surface hardness, acrylic esters and particularly methyl methacrylate resins have long been considered most desirable for optical applications and have been found highly effective for the present invention. More recently, other resins have been proposed, including allyl esters, polyvinyl carbazole, cellulose acetate of high acetyl value and polypropylene.

Although various plasticizers may be included in clear resin formulations to absorb the bulk of the ultraviolet rays, the preferred protective lenses utilize dyes and surface coatings conventionally employed for shading the lens to absorb substantially greater amounts of ultraviolet and infrared rays, and such plasticizers may be incorporated therewith.

The protective lens may be molded or cast into the desired configuration preferably with the lip being integrally formed during the operation although the lip may be separately formed and secured to the body portion so as to be integral therewith. From the standpoint of facility and speed of operation, molding has proven most advantageous. However, casting may be desirable because of the superior hardness which may be obtained from some casting resin formulations.

The corrective lens may be either polished optical glass or synthetic plastic similar to that of the protective lens which has been cast and/or polished to the proper corrective factor. Generally, optical glass is preferred because the corrective factors are most closely obtained therein and because of its hardness and resistance to marring.

To avoid possible error on the part of the optician, the preferred lens systems employ protective lenses which are substantially without power, at least in the portion overlying the corrective lens. In this manner, the optician need only select a corrective lens of the prescribed power to determine the optical power of the lens system. However, as hereinbefore stated, protective lenses having corrective power in the overlying portion may be utilized to provide a composite correction with greater optical resolution albeit with the requirement that the dispensing opticians ascertain the corrective power of the protective lens when inserting a new corrective lens. Moreover, the protective lens may have a minor negative correction in the wrap-around portion as described earlier.

The corrective lenses can be of positive or negative power or cylindrical with properly oriented axes for astigmatic correction combined with the necessary spherical components. It can also be understood that a composite corrective lens may be inserted for use of the lens system as bifocal or trifocal. Accordingly, the ophthalmologist or optometrist may readily select the corrective lens required for the patient's needs and can also rotate it within the lip or ring to obtain the desired location of the optical axis. This is particularly important in post-operative treatment and convalescence of the patient. For example, following cataract removal, the patient generally requires a plus 10 correction combined with a plus one or two cylinder, generally as illustrated by the corrective lens in FIGURES 4 and 5. Over a period following the surgical procedure, the astigmatic resolution of the aphakic eye varies, and the corrective lens may be rotated to meet the changing needs or replaced if necessary. Similarly, following surgical procedures for scleral buckling of detached retinas, the patient may require a lens of high negative correction as illustrated in FIGURE 6.

In order to fix the spectacles upon the patient's head during the initial post-surgical period, it will be readily appreciated that the temples may be taped in place, thus providing protection from physical trauma during sleep and semi-consciousness.

The corrective lens system of the present invention may be utilized to provide the same or varying correction for both of the user's eyes in a bilateral corrective assembly. However, where only unilateral correction is required, a corrective lens system of the present invention may be employed in combination with only a protective lens shell for the other eye which preferably has no retaining lip or ring thereon. In training patients having amblyopic vision, a colored opaque lens may be utilized over the dominant eye and a corrective lens system of the same color over the weaker eye so as to provide a cosmetically attractive but corrective assembly.

Thus, it can be seen that the lens system of the present invention affords great adaptability in corrective factors while providing excellent protection from physical and light trauma. By insertion of the corrective lens normally required by the patient, the spectacles are also highly advantageous for use by the patient after recovery or by athletes and by persons who require correction and spectacles which provide good protection from physical trauma to the eye by fast-moving air streams and airborne particles such as skiers, cyclists, boaters and parachutists, especially by use of the preferred curvilinear protective lens which produces optimum dynamic flow effects along its front surface.

Although but one embodiment of the invention has been shown and described herein, it will be understood by those skilled in the art that modifications may be made without departing from the spirit of the invention.

Having thus described the invention, we claim:

1. A corrective lens system comprising a transparent protective lens of major dimension fabricated of synthetic plastic material, said protective lens having a body portion dimensioned to overlie the orbital region and being substantially curvilinear in cross section with a concave posterior surface, said protective lens having an annular lip portion on the posterior surface of said body portion and integral therewith, said lip portion being spaced inwardly from the periphery of said body portion and projecting posteriorly therefrom; and a corrective lens releasably mounted within said lip portion, said lip portion providing a seal about the periphery of said corrective lens and the underlying surface of the body portion to prevent contamination and soiling of the opposed surfaces thereof, said body portion of said protective lens being continuous and extending across the annular lip portion and the anterior surface of said corrective lens.

2. The corrective lens system of claim 1 wherein the anterior and posterior surfaces of said protective lens are cooperatively curved to provide substantially no optical power in the portion overlying the corrective lens and thereby to permit the corrective lens to determine essentially the optical power of the lens system.

3. The corrective lens system of claim 1 wherein the anterior and posterior surfaces of said protective lens are cooperatively curved to provide an optical correction in the portion overlying the corrective lens and thereby to cooperate with the corrective lens to provide a composite correction.

4. The corrective lens system of claim 1 wherein the anterior and posterior surfaces of said protective lens are cooperatively curved to provide a correction in a portion outwardly of said annular lip portion.

5. The corrective lens system of claim 1 wherein said lip portion is of generally triangular cross section and has an inner side wall which inclines radially inwardly to its apex to provide an aperture of lesser cross section at the apex than at the base thereof, said lip portion being of greater axial height than the thickness of the periphery of said corrective lens and firmly engaging the posterior side edge of said corrective lens and overlying the adjacent posterior surface of said corrective lens to seal the opposed surfaces and prevent contamination and soiling thereof.

6. The corrective lens system of claim 1 wherein said body portion of said protective lens is substantially a segment of a sphere and is configured to closely conform to the margins of the orbital region.

7. A corrective lens system comprising a transparent protective lens of major dimension integrally formed from synthetic plastic material, said protective lens having a body portion dimensioned to overlie the orbital region and being configured to closely conform to the margins of the orbital region, said body portion being substantially a segment of a sphere with a concave posterior surface, said lens having an annular lip portion integrally formed upon the posterior surface of said body portion inwardly of the periphery thereof and projecting posteriorly therefrom, said lip portion being of generally triangular cross section with the inner side wall inclined inwardly to provide an aperture of lesser cross section at the apex than at the base thereof; and a corrective lens releasably mounted in said annular lip portion, said lip portion being of greater axial height than the thickness of the periphery of said corrective lens and firmly engaging the posterior side edge of said corrective lens and overlying the adjacent posterior surface to seal the opposed surfaces of said lenses and prevent contamination and soiling thereof, said body portion of said protective lens being continuous and extending across said annular lip portion and the anterior surface of said corrective lens.

8. The corrective lens system of claim 7 wherein the anterior and posterior surfaces of said protective lens are cooperatively curved to provide substantially no optical power in the portion overlying the corrective lens and thereby to permit the corrective lens to determine essentially the optical power of the lens system.

9. The corrective lens system of claim 7 wherein the anterior and posterior surfaces of said protective lens are cooperatively curved to provide an optical correction in the portion overlying the corrective lens and thereby to cooperate with the corrective lens to provide a composite correction.

10. The corrective lens system of claim 7 wherein the anterior and posterior surfaces of said protective lens are cooperatively curved to provide a correction in a portion outwardly of said annular lip portion.

No references cited.

DAVID H. RUBIN, *Primary Examiner.*